US009690977B2

(12) United States Patent
Szeliski et al.

(10) Patent No.: US 9,690,977 B2
(45) Date of Patent: Jun. 27, 2017

(54) OBJECT IDENTIFICATION USING 3-D CURVE MATCHING

(71) Applicant: MICROSOFT TECHNOLOGY LICENSING, LLC, Redmond, WA (US)

(72) Inventors: Richard Szeliski, Bellevue, WA (US); Edward Hsiao, Pittsburgh, PA (US); Sudipta Sinha, Redmond, WA (US); Krishnan Ramnath, Redmond, WA (US); Charles Zitnick, Seattle, WA (US); Simon Baker, Palo Alto, CA (US)

(73) Assignee: Microsoft Technology Licensing, LLC

( * ) Notice: Subject to any disclaimer, the term of this patent is extended or adjusted under 35 U.S.C. 154(b) by 36 days.

(21) Appl. No.: 14/794,608

(22) Filed: Jul. 8, 2015

(65) Prior Publication Data
US 2015/0310257 A1 Oct. 29, 2015

Related U.S. Application Data

(62) Division of application No. 13/328,133, filed on Dec. 16, 2011, now Pat. No. 9,111,349.

(51) Int. Cl.
*G06K 9/00* (2006.01)
*G06T 7/564* (2017.01)

(52) U.S. Cl.
CPC ..... *G06K 9/00214* (2013.01); *G06K 9/00785* (2013.01); *G06T 7/564* (2017.01); *G06T 2207/30236* (2013.01)

(58) Field of Classification Search
CPC .......... G06K 9/00201; G06K 9/00208; G06K 9/00214; G06K 9/6202; G06K 9/6203; G06K 9/6204; G06K 9/6215; G06T 7/0024; G06T 7/003; G06T 7/0032; G06T 7/0044; G06T 7/0046; G06T 7/0067; G06T 7/30;
(Continued)

(56) References Cited

U.S. PATENT DOCUMENTS 5,459,636 A * 10/1995 Gee et al. ............... 364/516
2013/0070995 A1 * 3/2013 Chou et al. ............. 382/131

OTHER PUBLICATIONS

Pötsch et al., "3D Object Category Pose from 2D Images using Probabilistic 3D Contour Models", AAPR Workshop 2011, May 26-27, 2011, 8 pages.*

* cited by examiner

*Primary Examiner* — Andrew W Johns
(74) *Attorney, Agent, or Firm* — Lee & Hayes, PLLC

(57) ABSTRACT

The claimed subject matter provides for systems and/or methods for identification of instances of an object of interest in 2D images by creating a database of 3D curve models of each desired instance and comparing an image of an object of interest against such 3D curve models of instances. The present application describes identifying and verifying the make and model of a car from a possibly single image—after the models have been populated with training data of test images of many makes and models of cars. In one embodiment, an identification system may be constructed by generating a 3D curve model by back-projecting edge points onto a visual hull reconstruction from silhouettes of an instance. The system and methods employ chamfer distance and orientation distance provides reasonable verification performance, as well as an appearance model for the taillights of the car to increase the robustness of the system.

20 Claims, 13 Drawing Sheets

(58) Field of Classification Search
CPC ......... G06T 7/337; G06T 7/344; G06T 7/564; G06T 7/74; G06T 7/75
See application file for complete search history.

OBJECT IDENTIFICATION USING 3-D CURVE MATCHING

CROSS-REFERENCE TO RELATED APPLICATIONS

The present application is a divisional of U.S. patent application Ser. No. 13/328,133 filed on 16 Dec. 2011 and claims priority to and benefit thereof and is incorporated by reference in its entirety.

BACKGROUND

Object recognition and identification are well-known problems in the areas of computer vision, computer graphics and artificial intelligence. Typically, a computer is given the task of identifying an object within a given image. The image may be taken of a scene and a context may be imputed—explicitly or implicitly—to the image and/or scene. This is something that humans do readily; but which computers are currently less successful than humans.

In the field of security, there are attempts to automate the recognition of objects of interest within images by law enforcement or other governmental agencies. For example, the automated identification of humans, containers, cars or the like could be very helpful to such agencies—where the number of real-time and recorded images have increased with the number of cameras or other image capture devices placed in high security areas.

Other fields of business are interested in a solution to the automatic identification of objects for various reasons—e.g., an inventory system keeping track of particular objects within a given vicinity or the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for systems and/or methods for the identification of instances of an object of interest in 2D images by creating a database of 3D curve models of each desired instance and comparing an image of an object of interest against such 3D curve models of instances. In one embodiment, systems and methods are described for identifying and verifying the make and model of a car from a possibly single image—after the models have been populated with training data of test images of a plurality of makes and models of cars.

In another embodiment, an identification system may be constructed by generating a 3D curve model by back-projecting edge points onto a visual hull reconstruction from silhouettes of an instance. The system and methods employ chamfer distance and orientation distance provides reasonable verification performance, as well as an appearance model for the taillights of the car to increase the robustness of the system.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
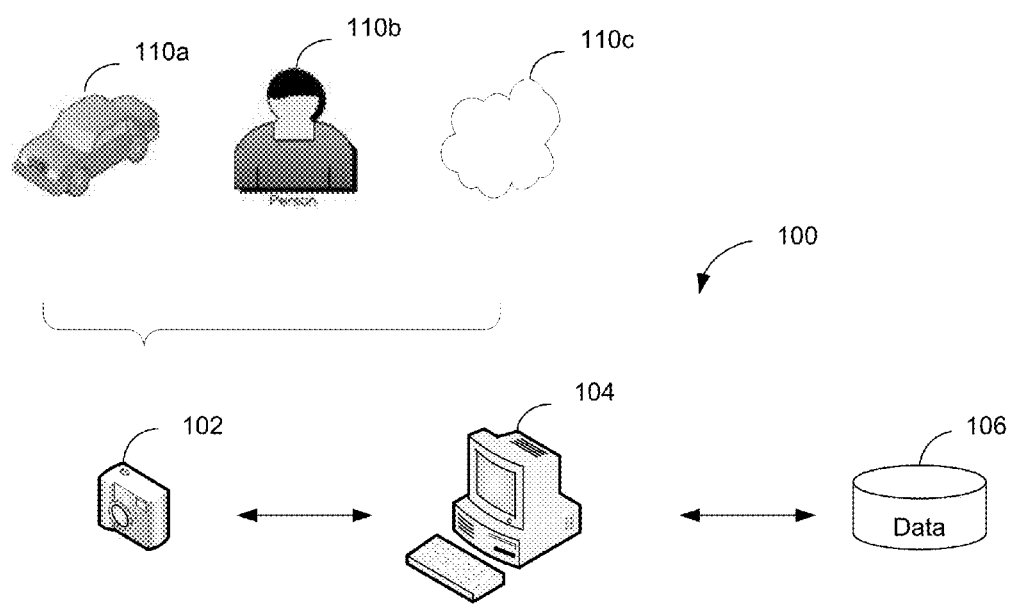
FIG. 1 shows one possible embodiment of a system that recognizes objects from selected images.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

Several embodiments of systems and methods will now be described that automatically detect objects of interest from images. Although the techniques described herein are to be construed as generally applying to the identification of any object of interest, the discussion herein will be particularly tailored to the identification of one object of interest—namely, the make and model of a car or vehicle found in a captured image wherein the image of the car may be of arbitrary orientation. The techniques herein are suited to this problem domain subset—because of the readily-noted features of a car's design, shape and edge contours.

The general approach described herein is to build a database of known instances of objects of interest during a training phase. Such a database may comprise a dataset of 3D curves derivable from a 3D volumetric model—which is, in turn, derivable from a set of 2D image captures made at various angles and orientations. An edgemap of features may be superimposed upon such 3D volumetric models to further aid in the identification of particular instances. Once a database of objects of interest is constructed in the training phase, particular objects may then be identified within a captured image by the use of the matching techniques described herein.

As was mentioned, although the present embodiments and discussions will center about the identification of cars as the objects of interest, it should be appreciated that the present innovation is not so limited and may be used to identify the instances of many different types of objects of interest.

Image Database Creation

As mentioned, one embodiment of the present application is a system that may create the image data that may be used to in order to identify objects with particular features—e.g., cars with particular contour lines, shapes, and other identifying features.

Referring now to FIG. 1, one embodiment of a system 100 is shown that may be used to create an image database. System 100 comprises an image capture device 102 (e.g., camera, CCD array or the like), computer (and/or processor) 104 and computer data storage 106 (e.g., RAM, ROM, DVD, flash, volatile, non-volatile, etc.).

Computer 104 further comprises a processor and memory (not shown) in which is stored machine readable code and/or instructions that affect a matching technique that matches 3D curve models with test images (either 2D or 3D) that purportedly contain the image of objects of interest embedded within a test image. Memory 106 may also comprise machine readable code and/or instructions that affect a technique for constructing the database of the 3D curve models of a set of objects of interest used in the aforementioned matching technique.

It should be appreciated that computer data storage 106 may be either internal to computer 104—or external to computer 104 and accessible to computer 104 via any known wired or wireless communications pathway (e.g. USB, WiFi, internet access or the like).

In addition, image capture device 102 may either be integral to computer 104—or may be external and accessible via any known wired or wireless communication pathway. Thus, in some embodiments, system 100 may optionally comprise such image capture devices for capturing images of objects of interest for constructing a database of 3D curve models and/or capturing images of scenes that may contain the image of a putative object of interest. In other embodiments, system 100 may have disparate pathways for the accretion of image data—either via ports to external devices, like memory sticks—or to networked data, such as the internet.

System 100 would be capable of capturing or otherwise accessing image data (e.g. 2D images) of objects of interest. For example object 110a is a car, 110b is a person and 110c is just a generalized notion of an object. Once the object of interest is selected, then system 100 may be trained on a set of instances of that object—e.g., a set of makes and models of cars, identifying certain individual persons, or particular generalized objects. In the present application, the paradigm embodiment will be described in the context of the identification of different makes and models of cars; but, it will be appreciated that other objects of interest and sets of instances of these objects are also encompassed by the techniques of the present application.

It will also be appreciated that—once the image database is created to affect object recognition (as described later)—a system similar to (or, alternatively, the same) system 100 of FIG. 1 may be used to capture the images of unknown objects and compare data derived from those images to process and compare or otherwise match against image data stored in storage 104 to make an object identification.

As will be described further herein, one embodiment of the present application may access 2D image data of an instance (e.g., as may be taken by a conventional camera, CCD array or any other image capture device—or may be input via any interface, wired or wireless, that is known) and—from that set of 2D images create a 3D visual hull of that particular instance. From that visual hull, additional features may be identified and associated from the instances (e.g., curved line features) and superimposed upon the 3D visual hull.

Figure 2:
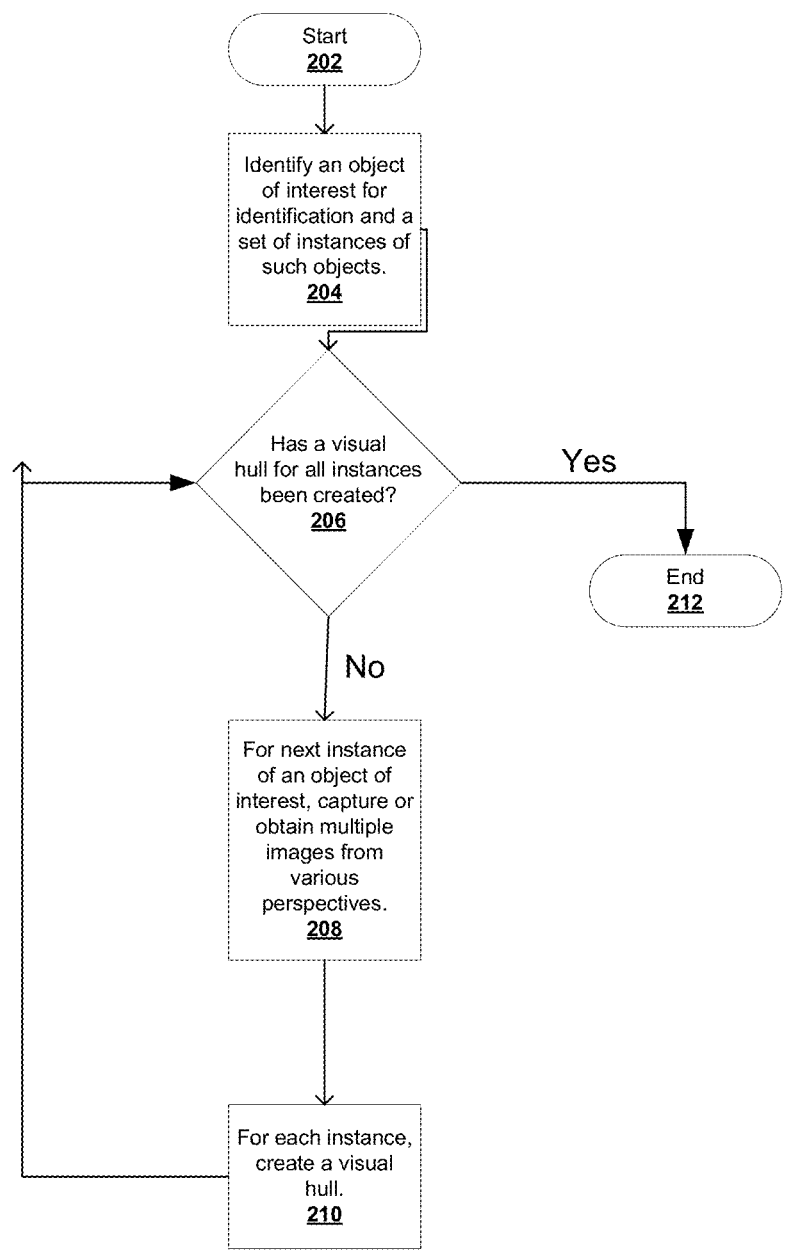
FIG. 2 is one embodiment of a flowchart for the creation of database of visual hulls for a number of instances of an object of interest.

FIG. 2 is one embodiment of a flowchart describing the high level functionality for the creation of a data set and/or a database of visual hulls of instances of an object of interest. At step 202, the process would start and commence with the identification of an object of interest and all instances of such an object of interest at 204. For example, in the paradigm example of this application, the object of interest is a car and the various makes and models of cars would be the instances of this object of interest. In one embodiment, the process may consider whether visual hulls have been created for all instances desired to be later identified at 206. Of course, other embodiment may work on a partial set of visual hulls and a partial set of instances and still operate in a manner consistent with the present application.

If all instances have their associated visual hulls created and stored for them in a data set and/or a database, then the process may terminate at 212. Otherwise, for a next instance, the process may capture or otherwise obtain a set of images of that instance at 208. This set of images may be 2D images taken at various angles and/or perspectives of the instance. In the present paradigm embodiment, a particular make and model of a car (e.g., 2003 Honda Civic Hybrid) may have the front, rear, driver and passenger sides captured as a set of image. Other images may be taken—such as a top view, or at unique angles of the various side views. From this set of images of the instance at question, the process would create a visual hull at 210, as will be described in greater detail below.

Figure 3:
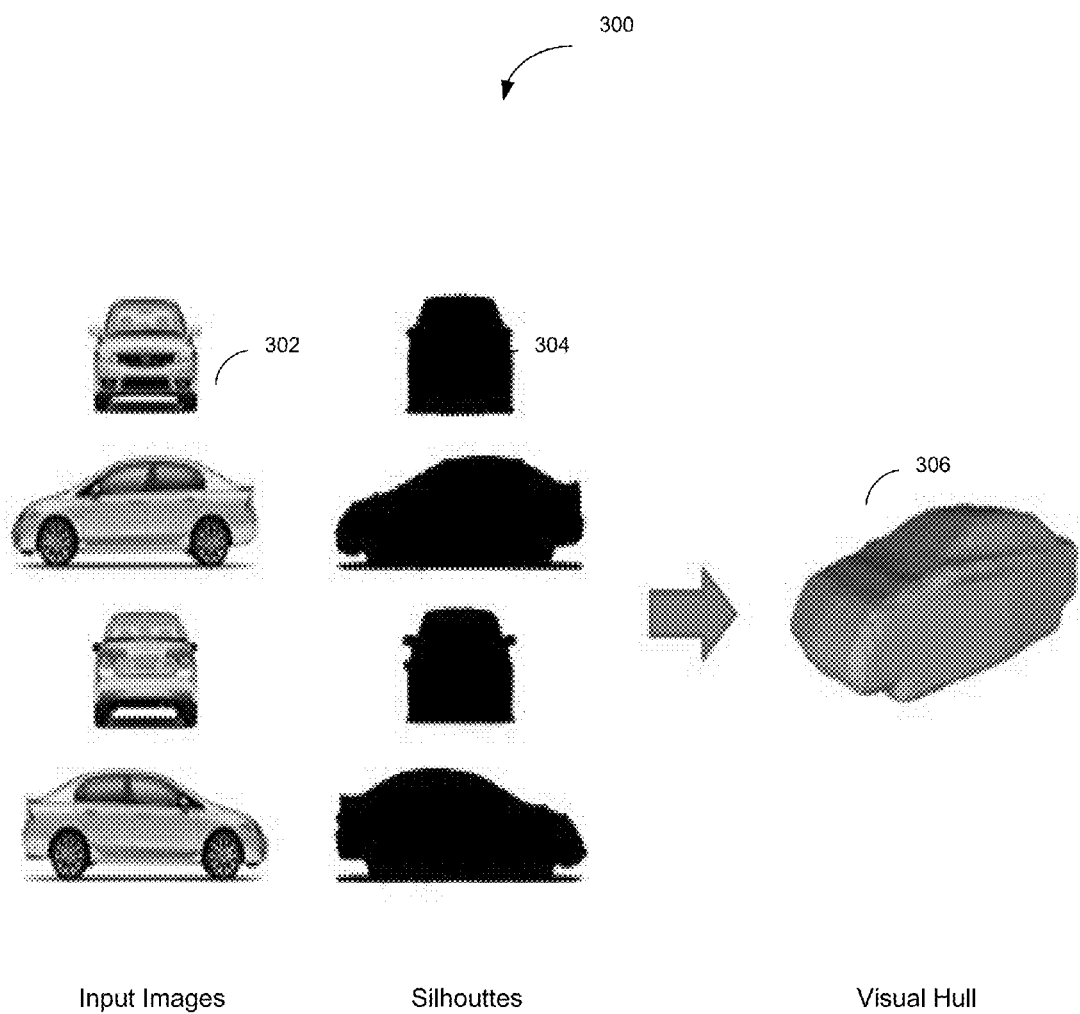
FIG. 3 depicts the creation of a visual hull derived from a number of input images and their associated silhouettes.
Figure 5:
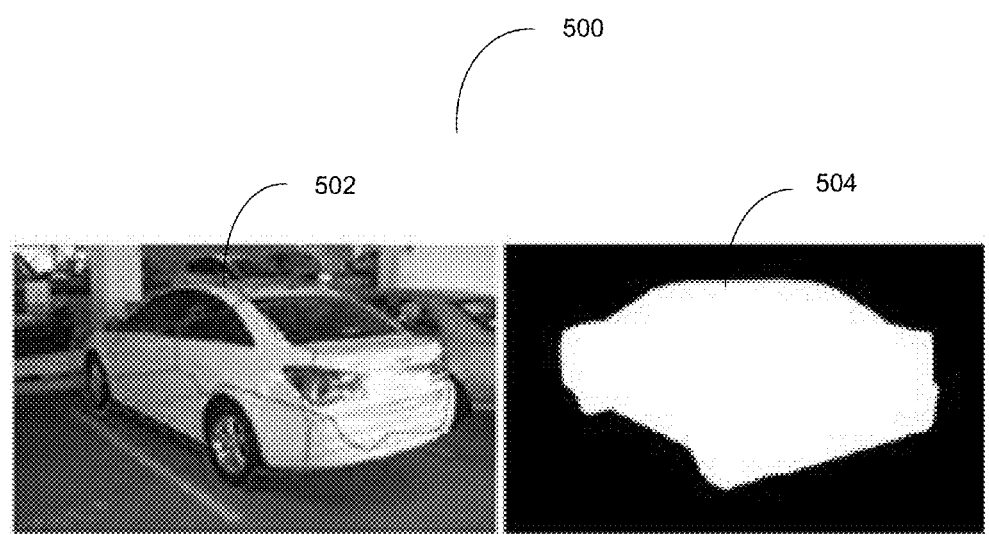
FIG. 5 shows one embodiment of the derivation of a particular car's silhouette from a particular 2D view.

FIG. 3 shows one embodiment of a process of creating visual hulls. Process 300 is depicted as inputting images 302 of a particular instance (in this case, a car)—a front, two side and a rear view—and possibly taken against a clean background. From these images, silhouettes 304 are created. These silhouettes are then further processed and/or merged to create a visual hull 306 of the particular instance in question. FIG. 5 shows another embodiment 500 of one view 502 of a car, taken "in the wild" (as opposed to images taken against a clean background), whose silhouette 504 may be extracted from image 502.

3D Curve Model

If the model view and test view are substantially close, a 2D alignment may often achieve good alignment. In one embodiment affecting 2D alignment, it is possible to use chamfer distance matching and Active Shape Models (ASM) for alignment.

Often times, the model view and the test view may be taken at different camera heights, and this perspective change may not be fully addressed by a similarity transform. An active shape model (ASM) represents a shape as a linear combination of many basis shapes. For a shape with N markers, let $s=(x_1, y_1, x_2, y_2, \ldots, x_N, y_N)$ specify the 2D positions. Then an active shape model decomposes this shape as, $$s = s_0 + \sum_{i=1}^{K} \lambda_i s_i \qquad \text{eq(1)}$$

where $\{s_i\}$ denotes the shape basis. The shape basis may then be computed using known Principal Component Analysis (PCA) from a training set of aligned shapes.

In general, active shape models may not reflect the true 3D transformation of rigid car features, one embodiment is to directly build a 3D model. This may be accomplished by having edges on the car to be represented by 3D space curves. In one embodiment, it is possible to extract these curves from natural training images, rather than CAD models, since these may provide for a better match the curves that are extracted from test images taken "in the wild". In the present embodiment, the systems and methods generate a 3D space curve model and match them to new input images.

In one embodiment, it is possible to represent the 3D curves on the car by a set of N, 3D points $P_i$. The goal of alignment is to recover the $M=K[R|t]$ of the 3D model that minimizes the sum of reprojection errors between the N, projected 3D model points and the $N_i$ 2D edge points in the test image, $\{p_k\}$. The optimal transformation $M^*$ is the one that minimizes $$D_c = \frac{1}{N_m} \sum_{i=1}^{N_m} \min_k d(p_k, \wp M P_i) \qquad \text{eq(2)}$$

where $d(p,q)$ is one possible 2D distance metrics. Here, the operator $\wp$ projects 3D points onto a 2D plane, and the minimum distance over the test image points $\{p_k\}$ may be computed using a distance transform.

One embodiment for the constructing of a system might include a single global 3D model. However, in another embodiment, it is possible to construct a view-based model consisting of V separate 3D models. For a new test image, it is possible to choose the 3D points from the closest training image and align these to the test image using a rigid 3D perspective image transformation.

In this embodiment, subtle view-dependent features may be modeled, and the visibility of the curves may be handled more naturally. One possible method for obtaining 3D points from 2D points is to first obtain correspondences in 2D using discriminative features such as SIFT and to then triangulate these points in 3D. For curves, however, computing point-to-point correspondences from adjacent images might be a challenging problem.

Therefore, in another embodiment, it is possible to first build a visual hull model of each car, and then use this geometry as the initial basis for 3D curve locations, which may then be further refined using robust three-view stereo matching.

Intrinsic Camera Calibration

Before constructing a visual hull and matching curves in 3D, it may be desirable to estimate the intrinsic $K_v$ and extrinsic $[R_v|t_v]$ camera parameters for each view v. Since the training images may be taken as if the cars were placed on turntables, it may be assumed that the rotations are at equal increments around the vertical axis, that the camera has no tilt or twist, and it is placed at a unit distance away from the origin. However, neither the focal length f nor the optical center $(c_x, c_y)$ of the camera needs to be known beforehand.

Figure 4:
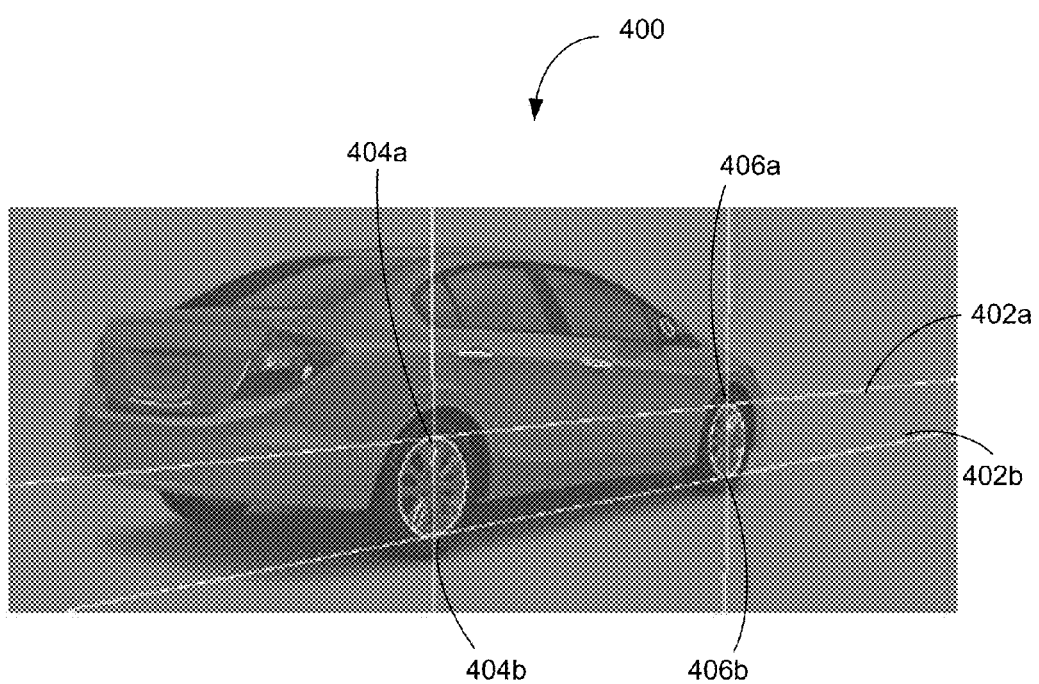
FIG. 4 shows a side view of a car and the respective ellipses bitangents of visible wheels in a car's image.

Under such assumptions, it is possible, in one embodiment, to use the vanishing points corresponding to the lines passing through the top and bottom of the wheel hubcap rims (which are extracted using traditional edge detection followed by ellipse fitting) to estimate the camera intrinsics. Let $$R_v = \begin{bmatrix} \cos\theta_v & 0 & \sin\theta_v \\ 0 & 1 & 0 \\ -\sin\theta_v & 0 & \cos\theta_v \end{bmatrix} \qquad \text{eq(3)}$$

$$K_v = \begin{bmatrix} f & 0 & c_x \\ 0 & f & c_y \\ 0 & 0 & 1 \end{bmatrix} \qquad \text{eq(4)}$$

and $P_\infty = (0, 0, 1)$ be the point at infinity corresponding to this vanishing point. It is then possible to estimate the camera intrinsics by solving the overconstrained set of equations arising from the vanishing points $(x_v, y_v)$, $$x_v = f \tan \theta_v + c_x \qquad \text{eq(5)}$$

$$y_v = c_y \qquad \text{eq(6)}$$

for those images where the ellipse bitangents can be reliably detected. FIG. 4 shows one exemplary side view 400 of a car and the ellipse bitangents 402a and 402b shown. These bitangents are seen as tangent to the top points 404a and 406a of the two wheels as shown and to the bottom points 404a and 406b as well.

Refinement

The embodiment discussed above generated by using the ellipse detections as input may be refined for better recognition. In one embodiment, a refinement step may be possible to obtain a more accurate representation of the car in the image. Assume, for the simplicity of explanation, that a ground truth segmentation $silh_{gt}$ of the car in the image is provided. In practice, this segmentation—which can be provided by GrabCut or other segmentation algorithm—may be noisy and may be iteratively refined as well.

It is possible to define a function $silh(\gamma)$ which generates a silhouette from the parameters $\gamma = [v_1, v_2, s, t_x, t_y, \theta_{tilt}, y_{tilt}, d_{ext}, K]^T$, corresponding to the vanishing points, scale, translation, tilt, extrusion depth and camera calibration. It is possible then to optimize the parameters so that, $$\max_\gamma \frac{silh(\gamma) \cap silh_{gt}}{silh(\gamma) \cup silh_{gt}} \qquad \text{eq(7)}$$

This optimization may be performed using numeric gradient descent and may be initialized with the parameters from the preceding discussion. All position and length parameters may be normalized by one of the larger dimensions of the input image to ensure all parameters are on the same order of magnitude.

It will be appreciated that—although the current function uses only the segmentation of the car, it is possible to also include measures on edge similarity as well.

Visual Hull for 3D Curves

In one embodiment, one technique for obtaining 3D points from 2D points is to obtain correspondences in 2D and to triangulate the point in 3D. These 2D correspondences are usually obtained by matching discriminative features such as Scale Invariant Feature Transform (SIFT). For curves, however, other techniques may be employed to address related issues, such as computing point-to point correspondences from adjacent images.

Figure 6:
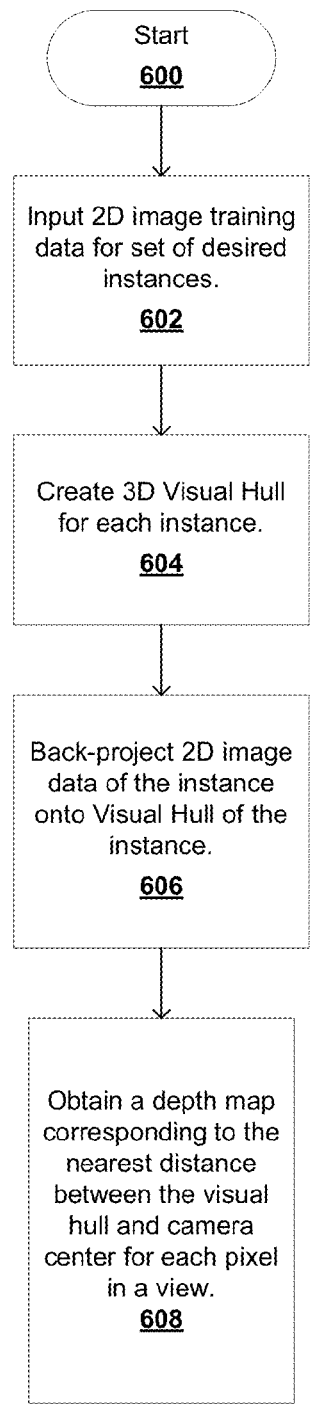
FIG. 6 depict one embodiment of a flowchart for deriving 3D space curves by back-projecting image points and/or edges from 2D images onto 3D visual hulls.

FIG. 6 depicts a high level flowchart of one embodiment for deriving 3D space curves. Starting at 600, the process would input 2D image data for each set of desired instances of an object of interest. In the paradigm example involving cars, the 2D training data may consists of V images (input at step 602) of a given make and/or model of car on clean backgrounds. From this set of training data, a 3D visual hull may be created at step 604. This may be created by the generation of silhouettes as previously discussed. In the embodiment involving cars, four views—comprising of the front, back and side views—may suffice in obtaining a fairly accurate visual hull, although more images may be used to compute a more accurate 3D model.

Figure 7:
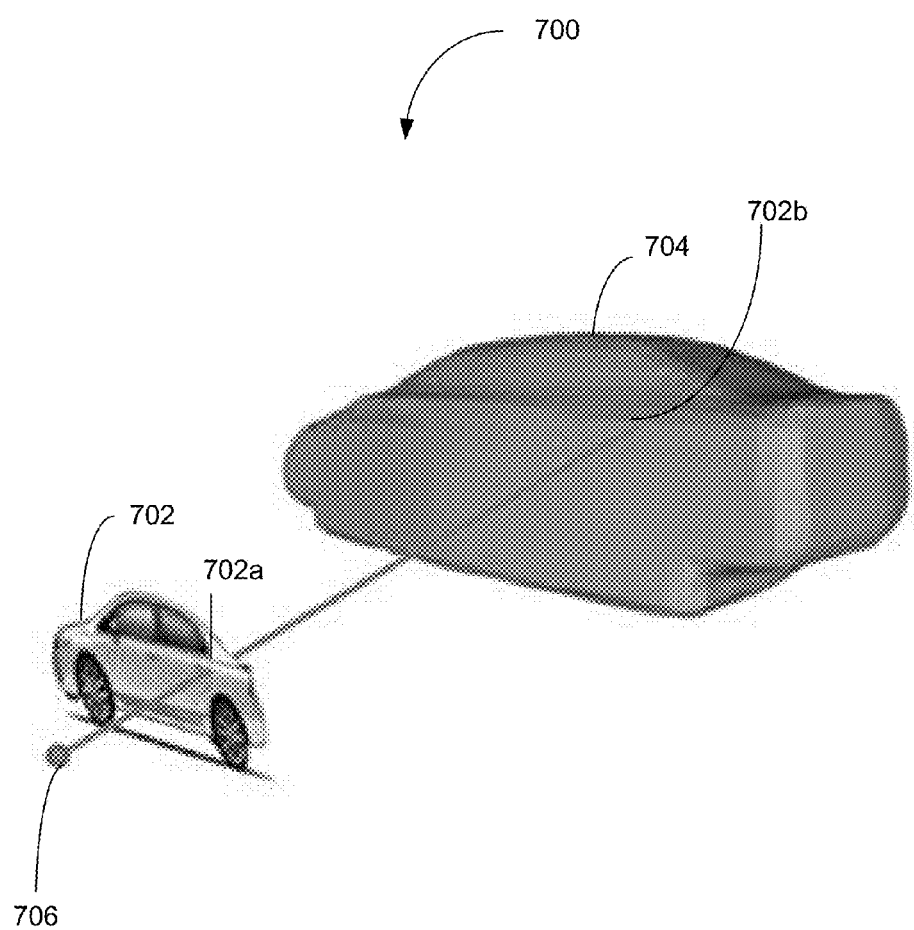
FIG. 7 depicts the back-projection of 2D image points onto a 3D visual hull.

At step 606, the 2D image data may then be back-projected onto the visual hull of the instance (e.g., car). FIG. 7 depicts one example 700 of a 2D side view image of a car 702 being back-projected on to the visual hull 704 for that particular make and model of the car. From a reference point 706, a point 702a (e.g., on a contour line of car) is projected to the hull 704 to find its corresponding 3D point 702b on the hull. When presented with a new camera position in another 2D training image, it may be desired to choose the 3D points from the closest training view. This may allow for a more accurate representation of the curves in each view and addresses the visibility of curves. To obtain the 3D space curves, one possible method comprises obtaining a depth map corresponding to the nearest distance between the visual hull and the camera center for each pixel of each view.

In another embodiment, if the given embodiment comprises training data that further comprises of V images of cars (possibly on clean backgrounds), it is possible to obtain an initial set of 3D space curves by backprojecting the 2D image curves onto an automatically generated visual hull of the car. Initially, it is possible to turn each input image into a binary silhouette using thresholding, followed by morphological operations to clean up the outline and remove small holes due to highlights. Next, it is possible to build a voxel-based 3D model by intersecting all of the silhouettes in 3D, and project this model into each image to obtain an associated depth map.

For one example, for a point p in image v, the 3D point P may be obtained by back-projecting the point onto the visual hull using, $$P = dR_v^{-1} K_v^{-1} \tilde{p} - t_v \qquad \text{eq(8)}$$

where the camera matrix of view v is $M_v = K_v[R_v, \pi_v]$, $\tilde{p} = (x, y, 1)$ is the homogeneous representation of the 2D point, and the depth to the visual hull at point p is d. In one embodiment, training images may be obtained as a shot against a white background, which may make the silhouette extraction for visual hull computation easier. For sequences shot against textured backgrounds, it is possible to use a 3D structure from motion system to build a 3D model of the background and then segment the car from the background.

Figure 8:
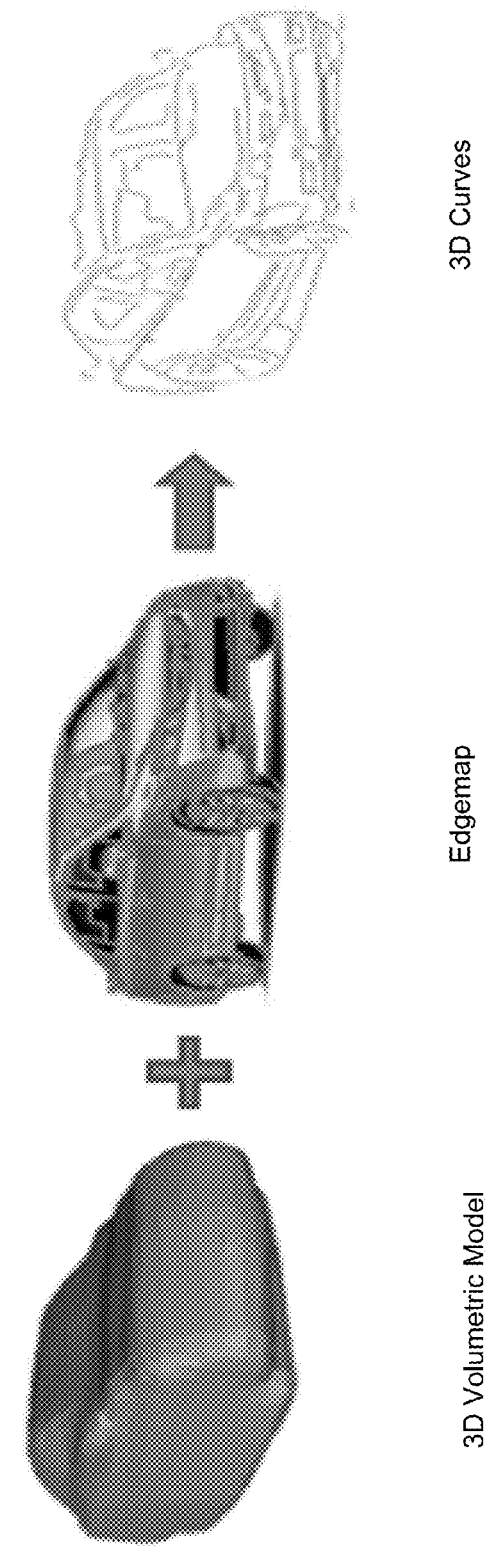
FIG. 8 depicts the creation of a 3D curve model based upon the back-projection of a number of edgemaps on a visual hull.

FIG. 8 depicts one embodiment of obtaining one particular resultant 3D curve model—derived from a 3D volumetric visual hull, as aligned with a 2D image (edgemap)—to create a 3D curve model for that particular view.

3D Curve Model Refinement

Figure 9:
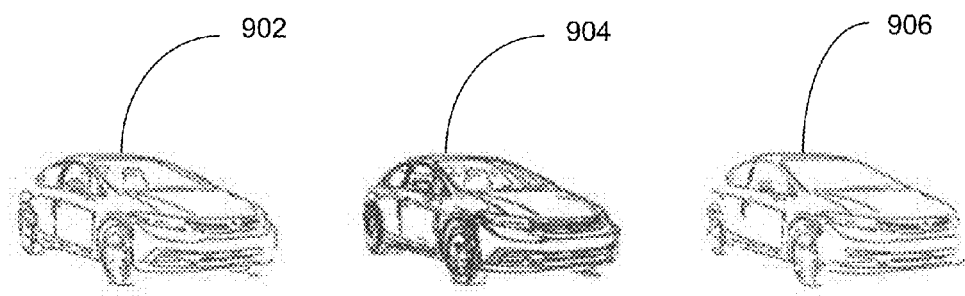
FIG. 9 shows three images of a 3D curve model from one unfiltered view, from a plurality of neighboring views, and a filtered one comprising consistent edges from such neighboring views.

Many of the edges seen on cars arise from lighting effects such as reflections and specularities. These spurious edges tend to introduce errors into the 3D chamfer matching score and it may be desirable to remove them for robust recognition. In one embodiment, a present system may use consistency of image data as presented in the 3D model—i.e., although spurious edges from neighboring views may be consistent in 2D, their locations in 3D may not be consistent with the visual hull model. FIG. 9 depicts three images—image 902 which is a 3D curve model derived from one view, image 904 which is a 3D curve model derived from a plurality of neighboring view and image 906 which is a filtered 3D curve model comprising consistent edges from such neighboring views. Thus, one embodiment for refinement of the 3D model proceeds by finding 3-view consistent edges using the 3D positions of the curves. It will be appreciated that a different number of views (other than 3) may also suffice for purposes of the present application.

Starting with a 3D curve model as described above, to remove the spurious edges for a view c, it is possible to choose a 3D point $P_c$ and consider the neighboring left view l and right view r. For simplicity of exposition, first consider two-view consistent edges with the left view l.

The system may project the 3D point $P_c^j$ from the center image into the left view using the camera matrix of the left view $M_l$ i.e., $p_{c,l}^j = \wp M_l P_c^j$. If a projected point $p_{c,l}^j$ is not within some distance threshold $\tau_d$ to any edge point $p_l^k$ in view l, the point may be removed. The same may be done for the right view. For those points $P_c^j$ that are retained, it is possible to refine their 3D positions by considering the nearest neighbor points $p_l^{k*}$ and $p_r^{k*}$. Given the original 2D point $p_c^j$, their corresponding neighbor points, $p_l^{k*}$ and $p_r^{k*}$, and the camera matrices from the neighboring views, it is possible to use the Direct Linear Transform to triangulate a more accurate 3D position for $P_c^j$. This refinement technique may be applied for every point in every view of the model—or to any desired subset of points.

Figure 10:
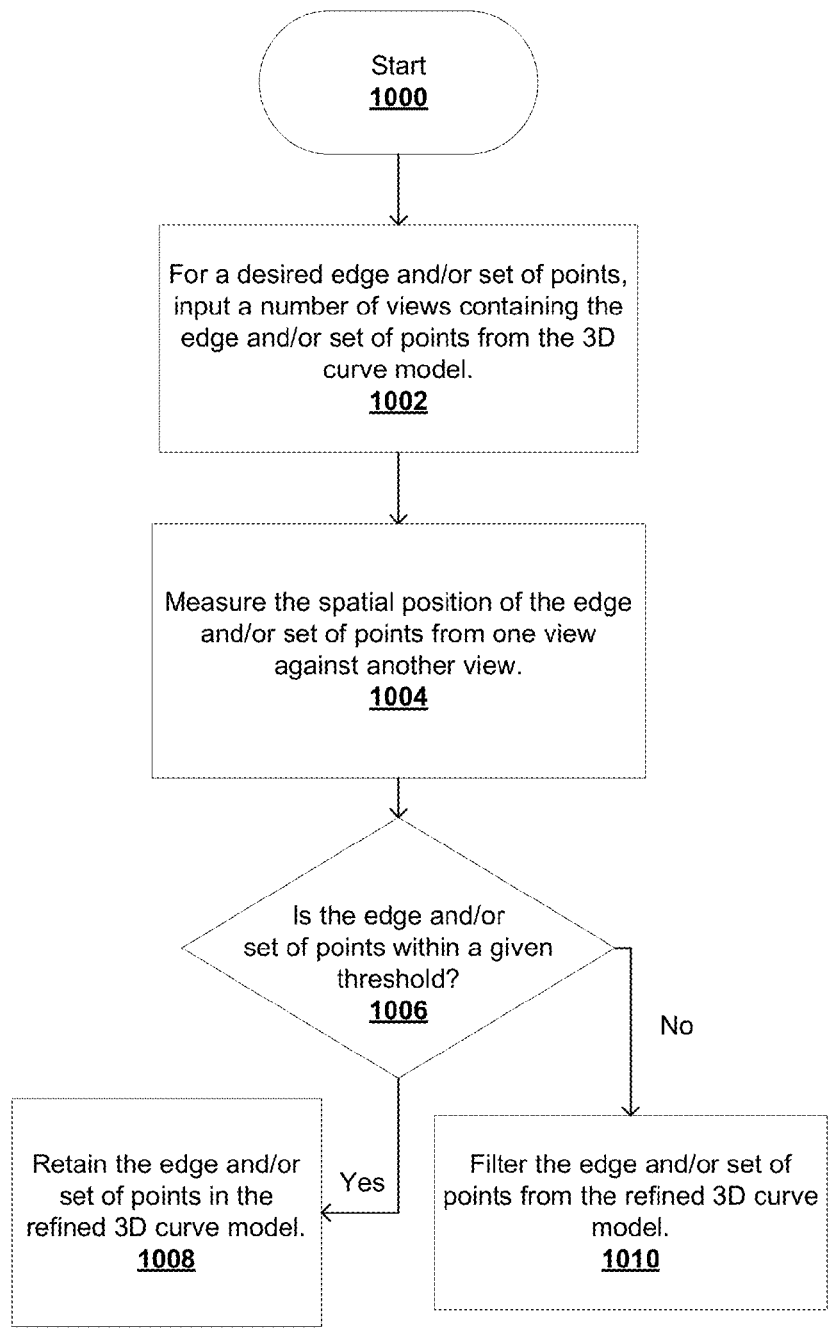
FIG. 10 depicts one embodiment of a refinement technique to the creation of a 3D curve model.

FIG. 10 depicts one embodiment of a technique by which the 3D model may be refined. The refinement starts at step 1000 with the 3D curve model generated as discussed herein. The process begins by inputting a number of views of a given edge and/or set of points from the 3D curve model at 1002. For example, in the car example, a set of three views—e.g. from neighboring views (such as a center, a right and a left view)—may be obtained. If the edge and/or set of points in question are found to be "consistent" edges and/or set of points from this 3-view perspective, then the edge and/or set of points may be retained and not filtered.

At step 1004, certain distances may be calculated from spatial positions embodiments in the various views. If the edge and/or set of points in question are within a given threshold distance at 1006, then the edges may be retained within the refined 3D curve model at 1008. Otherwise, the edges and/or set of points may be filtered from the 3D curve model at 1010.

Curve Weighting

Another source of model refinement may be based upon the distinctiveness of certain features. For example, certain curves on a car are more discriminative than others. When comparing a sedan and a SUV, the location of the car top may be discriminative. But when comparing a sedan and a coupe, the discriminative curves may be the location and shape of the car doors and windows. However, since it is desirable to verify one model against all other cars, it is possible to learn a set of generic weights for the curves.

To learn the weights, in one embodiment, it is possible to align all cars from the same view and consider—for each edge point on a model—the distance to the nearest edge point on all other models. If an edge point is near the aligned edge points of all other models, it may not be discriminative. On the other hand, if it is far from other points, than it is more discriminative.

It is possible to choose the weight of each point such that it maximizes the distance with all other models. In this embodiment, the system maximize the following, $$w_i = \text{argmax}_{w_i} \Sigma_{j=1, j \neq i}^{m} w_i D_j - \beta \|w_i\|_2^2 \qquad \text{eq(9)}$$

where $w_i$ is an n dimensional vector with one weight for each of the n model points. $D_j$ is the distance to the closest aligned point for model j and out of m different models. Then, the system may compute the optimal weight $w_i^*$ as, $$w_i^* \propto \Sigma_{j=1, j \neq i}^{m} D_j \qquad \text{eq(10)}$$

In one embodiment, the weight of each point may be proportional to the average distance to all other models and may be normalized to sum to 1.

Object Identification
3D Chamfer Matching

Once the present system has built a 3D view-based curve models, it is possible to use these to recognize the car make and model of a new test image. For each model, it is possible to estimate the transformation M=K[R|t] that minimizes the sum of reprojection errors $D_c$ given in equation (1) between the N, projected 3D points of the model, $\wp MP_i$, and the $N_i$ 2D points in the image, p.

To avoid an expensive search over all possible model poses and positions, it may be desirable to initialize the pose using a technique that reliably determines the car orientation from a test image. While a variety of such techniques have been developed, it is possible to perform an initial, rough, alignment between each model and each new test image. Such an initial alignment might be accomplished a number of ways—e.g., either manually or automatically with a 2D alignment against instances in the developed database.

Given this initial estimate, it is possible to refine it using chamfer matching—e.g., by minimizing equation (1) using the Levenberg-Marquardt non-linear least squares algorithm. To update the parameters controlling the camera projection matrix, M, it is possible to compute the Jacobian J for the camera parameters. The camera rotation may be represented by the axis-angle representation $w=\theta\hat{n}=(\omega_x, \omega_y, \omega_z)$ and the camera position by the camera center=$(c_x, c_y, c_z)$. It is also possible to allow the focal length f to vary and assume that the principal point $(c_x, c_y)$ is at the center of each test image. The camera parameter vector is thus specified by $\gamma = (\omega_x, \omega_y, \omega_z, c_x, c_y, c_z, f)$.

Figure 11:
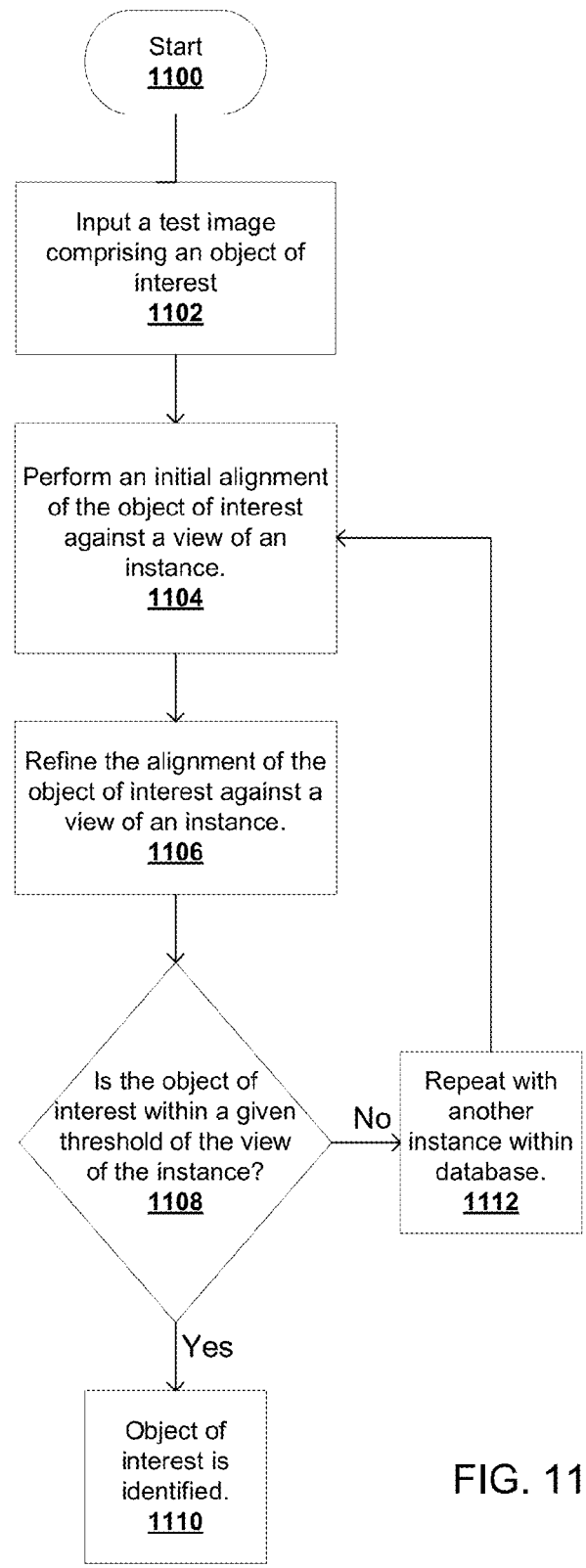
FIG. 11 depicts one embodiment of a high level technique for identifying an object of interest from a test image as one of a plurality of instances within a database of instances.

FIG. 11 depicts a high level flowchart of one embodiment of a system that may perform object identification of an object of interest in a test image when such object of interest (that is, the image of the object within the test image) is compared against a set of instances (that is, image data representing such instances) stored within a database—e.g., after a suitable training phase or in any other manner in which such data may come to reside in such database. The system, method and/or technique starts at 1100 and a test image comprising an object of interest is input at 1102. An initial alignment of the object of interest is performed against a view of an instance at 1104. It will be appreciated that the previous step may be performed as well with the view of the instance is aligned against the object of interest—or a combination in which both images may be adjusted suffices.

The alignment of one such image against the other is further refined at 1106. Any of the refinement techniques described herein would suffice for purposes of the present application. A measure of matching one image against the other may be subjected to a threshold test at 1108. If the match is within such a threshold, then the object of interest is identified as the present instance at 1110. Otherwise, another instance may be selected from the database at 1112 and the steps of the present embodiment may be repeated.

FIGS. 11A and 11B shows an example of the initial manual alignment followed by the automatic alignment obtained with 3D chamfer matching.

One detail that was left unspecified in the chamfer matching formula (1) was the form of the distance function d(p,q). The most common choice for this function is the squared Euclidean distance $d(p,q)=\|p-q\|^2$, but other, more robust or discriminative functions are possible.

To make the alignment process more robust to missing model points, one embodiment may use a robust Huber function, i.e., a quadratic function for $\|p-q\|<10$ pixels and a linear penalty for larger deviations.

In another embodiment, instead of minimizing the Euclidean distance $d(p,q)=\|p-q\|^2$, which fixes the association between model and test points, it is possible to use instead a perpendicular distance $$d_{\perp}(p, q) = n \cdot (p - q) \text{ with } n = \frac{p - q}{\|p - q\|} \qquad \text{eq(11)}$$

where n remains fixed during the Jacobian computation. This allows points to "slide" along curves in the direction perpendicular to the current error. In such an embodiment, this formula may result in faster convergence.

In another embodiment, since most edge pixels belong to long smooth contours, they have an associated 2D edge orientation. For two shapes to align properly, it may be desirable to, not only have close alignment of model to image edges, but also the orientation of the edges to be substantially the same. For example, a vertical model edge may not align well with a region with many horizontal edges, even though the distance to the nearest image edge is very small. To penalize such deviations, it is possible to use the orientation metric such as, $$D_\theta = \frac{1}{N_m} \sum_{i=1}^{N_m} |\theta(p_k) - \theta(q_i)| \qquad \text{eq(12)}$$

where $\theta(p_k)$ is the orientation of the closest edge point found in the original chamfer match (1), $\theta(q_i)$ is the orientation of the projected model point $q_i = \wp MP_i$, computed from its neighboring projected points, and $|\theta_1 - \theta_2|$ measures the angular difference modulo $\pi$.

3D Appearance Model of Lights

In particular reference to cars as the objects of interest, one other source of refinements may be in distinctiveness of the design of the taillights and/or headlights. The appearance and location of a car's lights are typically consistent across a make and model. If the correct 3D curve model is registered to a 2D image, the appearance and location of the lights in the image should also be consistent. Since the location of the lights varies significantly across different cars, especially those of different types (i.e. cars and SUVs), the appearance of the light region is a metric that can be used to verify if the correct model has been aligned to the image.

To use the lights for verification, it may be desirable to identify them in the training images and position them on the 3D curve model. In one embodiment, it is possible to model the appearance of the headlights and taillights with a Gaussian Mixture Model (GMM) on the a and b channels in L*a*b color space for all cars together. One assumption that may be made is that the taillights of cars are orange to red in color, which is true for most cars. It is possible then to ignore (or minimize) the L channel, as it may be desirable to have the system be robust in varying lighting conditions.

It is possible for the system to learn a GMM, P(X=FG) with two components and choose the dominant component as the taillight foreground model. The smaller component may correspond to the white and black portions of the headlights. It is also possible to model the background using a GMM P(X=BG) with three components. A pixel in the image may then be classified as taillight if, $$\frac{P(X = FG)}{P(X = BG)} > 1 \qquad \text{eq(13)}$$

Figure 12:
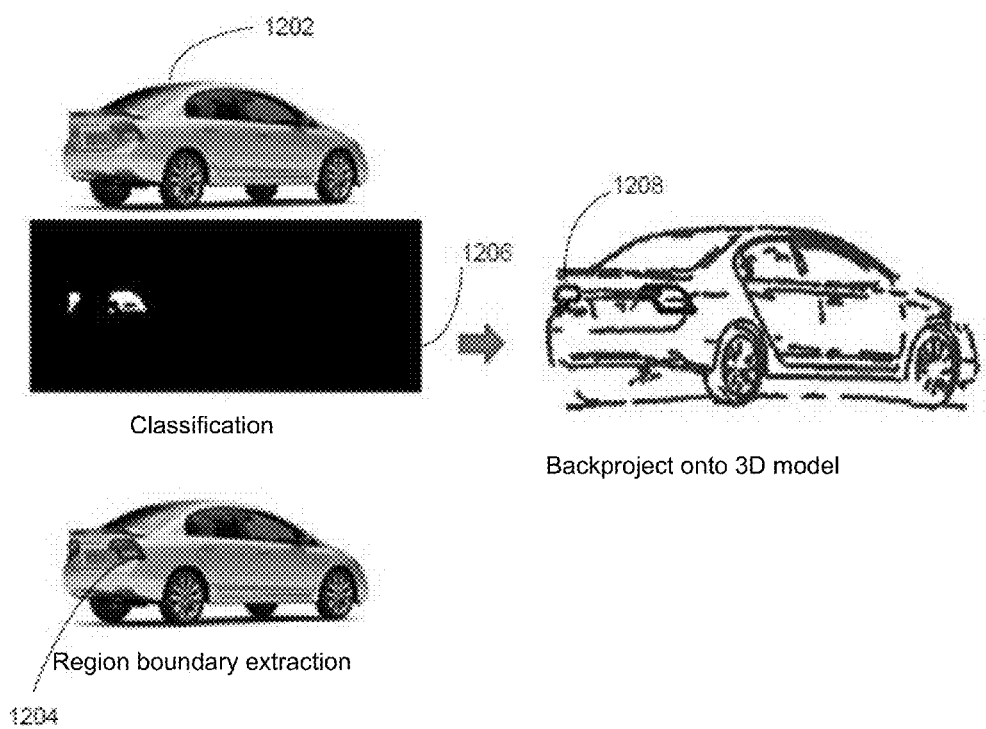
FIG. 12 depicts another refinement of the matching system with respect to distinctive shaping and other features of the lights of a car.

Such a generic taillight detector may be used to identify potential taillight regions in the training images. For regions that are large enough, it is possible to back-project the boundary onto the visual hull to obtain the region in 3D using Equation 20. Thus, a specific appearance model to the car may be obtained by learning a GMM for each taillight region separately. FIG. 12 depicts the embodiment for taillight refinement. Test image 1202 shows a partial rear view of a car and the taillights are visible from a given angle. The taillight region 1204 may be extracted or otherwise identified in the test image and the taillight regions may be classified (as in 1206). From this data, the taillight region may be specifically back-projected onto the 3D curve model 1208 as previously discussed.

Given an image and the aligned 3D model, the appearance of the taillight regions may be verified by projecting the boundary into the input image. This projection may define the predicted taillight region to be verified. It is possible to verify if this region is similar to the current model by first learning a GMM with the pixels inside the region and then comparing it to the model GMM of that region. Since the appearance model is a probability distribution, it is possible to use the KL divergence to compare how similar the model and image distributions are. It is also possible to use the Unscented Transform (UT) to approximate the KL divergence of two GMMS. The Unscented Transform may be faster and substantially as accurate as using Monte Carlo sampling. It is also possible to compute both the KL divergence from model to image, $D_{KL(M|I)}$ as well as the KL divergence from image to model, $D_{KL(I|M)}$, and use these values as features for classification.

It is possible to compute both the KL divergence from model to image, $D_{t1} = D_{KL(M|I)}$ as well as the KL divergence from image to model) $D_{t2} = D_{KL(I|M)}$. It is then possible to use these values as features for classification. It will be appreciated that the two color distributions for both KL divergences may be different.

Since there are usually multiple taillight regions, it is possible to combine the KL divergence scores of the different regions by weighting the KL divergence of each region based on its area. For one example, for N regions, the KL divergence score might be computed as:

$$D_{KL} = \frac{1}{A}\sum_{i=1}^{N} a_i D_{KL,i} \qquad \text{eq(14)}$$

where the total taillight area is $= \sum_{i=1}^{N} a_i$.

Figure 13A:
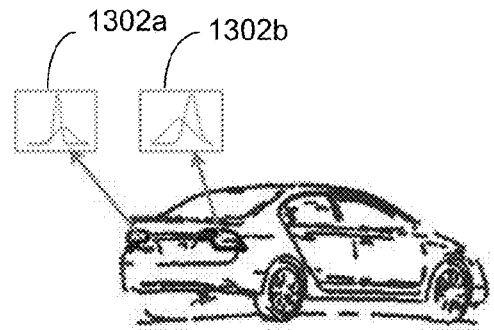
FIGS. 13A through 13D show various aspects of refining the present system with comparisons with taillight features.
Figure 13B:
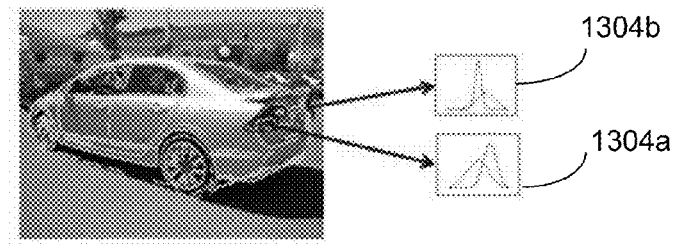
Figure 13C:
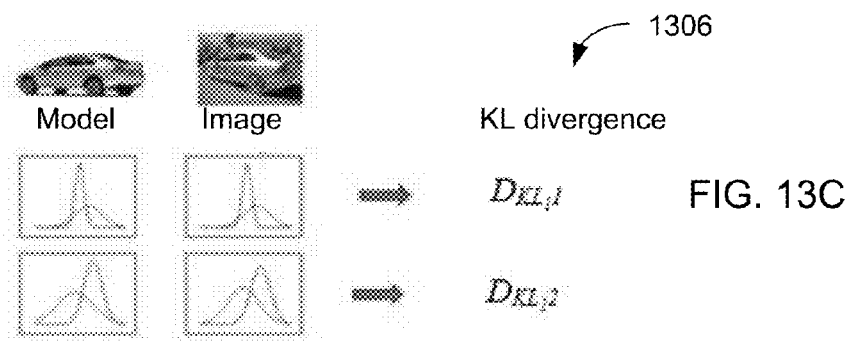
Figure 13D:
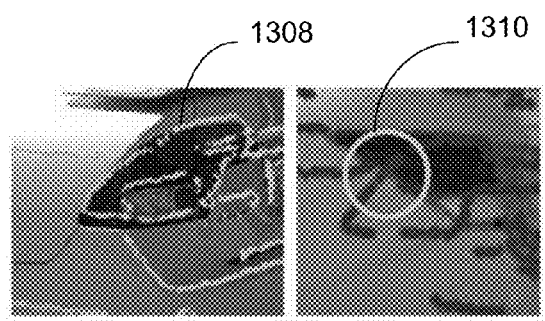

FIGS. 13A through 13D depict taillight refinement embodiments as discussed. FIG. 13A shows a 3D curve model comprising multiple taillight regions—with its associated KL divergence scores for both taillights, 1302a and 1302b respectively. FIG. 13B shows the associated KL divergence scores for both taillights on a test image, 1304a and 1304b respectively. FIG. 13 C shows how the KL divergence scores between the 3D curve model and the test image compare. FIG. 13D shows two images of a 3D curve model in the taillight area compare to a test image that matches (as in 1308) and in one test image that does not match (as in 1310). It may be seen that an edge of the taillight area in 1310 has a comparatively large orientation distance—which is consistent with a different taillight configuration.

Verification

A correctly aligned model to an image may have low chamfer distance as well as satisfy the appearance of the taillights in the image. The features used for classification may comprise the average chamfer distance $D_c$, average orientation distance $D_\theta$, and the two KL divergence metrics for the taillight appearance, $D_{t1}$ and $D_{t2}$. The average chamfer distances may be computed by choosing the nearest image point for each projected model point and summing the robust distance functions, divided by the number of model points $N_m$ to make the scores invariant to the number of model edges. For images where the taillight are not visible, it is possible to use only the chamfer distance and orientation distance. It is possible to perform classification using these features with logistic regression. The logistic regression outputs a probability that the aligned image tends to be of the specific make and model.

$$P(Y = 1 | D, \beta) = \frac{1}{1 + e^{-D\beta}} \qquad \text{eq(15)}$$

with $D_\beta = \beta_0 + \beta_1 D_c + \beta_2 D_\theta + \beta_3 D_{t1} + \beta_4 D_{t2}$.

To estimate the best $\beta$ parameters for each car model, it is possible to use leave-one-out cross validation (LOOCV) and find $$\beta^* = \text{argmax}_\beta \sum_t \ln P(Y_t | D_t, \beta) - \frac{\lambda}{2}\|\beta\|^2 \qquad \text{eq(16)}$$

where $Y_t = 1$ for positive training examples and $Y_t = 0$ for negative examples.

In this present application, there has been discussed a number of embodiments of models for verifying particular instances from objects of interest and, in particular, identifying and verifying the make and model of a car from a possibly single image—after the models have been populated with training data of test images of many instances (i.e., makes and models of cars). Many of the innovations presented herein employ view-based 3D curve modeling—which may help to reduce the volume of training data that typically is employed by only 2D models. In one embodiment, an identification system may be constructed by generating a 3D curve model by back-projecting edge points onto a visual hull reconstruction from silhouettes of an instance. Although using the raw chamfer distance and orientation distance provides reasonable verification performance, it is possible to incorporate an appearance model for the taillights of the car to increase the robustness of the system.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A system for the identification of an instance of an object of interest matching at least one 2D images of said instance with a database of 3D curve models of a set of said instances, said system comprising one or more computer processors and a plurality of components, each component comprising computer-executable instructions executing upon the one or more computer processors, the system comprising:
    an interface component, said interface inputting at least one 2D images of an instance;
    an alignment component, said alignment component matching said at least one 2D image to a given 3D curve model of at least one instance;
    a distance computing component, said distance computing component computing a distance between said at least one 2D image and said 3D curve model of said at least one instance.

2. The system of claim 1 wherein said system further comprises an image capture device connected to said interface component and said image capture device inputting 2D images of said instance.

3. The system of claim 1 wherein said interface component is connected to a network and said network inputting a set of 2D images of said instance.

4. The system of claim 1 wherein said alignment component comprises:
    a chamfer distance component, said chamfer distance component comprising computing an alignment error between said at least one 2D image and said 3D curve model of said at least one instance.

5. The system of claim 4 wherein said chamfer distance component further comprises a component for computing a distance transform image, said distance transform image comprising an alignment error.

6. The system of claim 4 wherein said chamfer distance component further comprises a component for computing non-linear least squares.

7. The system of claim 6 wherein said component for computing a Jacobian for camera parameters.

8. A method for identifying an instance of an object of interest matching at least one 2D images of said instance with a database of 3D curve models of a set of said instances, the method comprising:
    inputting at least one 2D image of an instance;
    matching the at least one 2D image to a given 3D curve model of at least one instance; and
    computing a distance between the at least one 2D image and the 3D curve model of the at least one instance.

9. The method of claim 8 wherein the method further comprises:
    connecting to an image capture device to input a 2D image of the instance.

10. The method of claim 8 wherein the method further comprises:
    computing an alignment error between the at least one 2D image and the 3D curve model of the at least one instance.

11. The method of claim 10 wherein computing an alignment error further comprises:
    computing a distance transform image, the distance transform image comprising an alignment error.

12. The method of claim 10 wherein computing an alignment error further comprises:
    computing a non-linear least square distance.

13. The method of claim 12 wherein computing an alignment error further comprises:
    computing a Jacobian for camera parameters.

14. One or more computer-readable storage devices comprising executable instructions by a processor, and said processor executing said instructions is configured to perform a method, the method comprising:
    inputting at least one 2D image of an instance;
    matching the at least one 2D image to a given 3D curve model of at least one instance; and
    computing a distance between the at least one 2D image and the 3D curve model of the at least one instance.

15. The one or more computer-readable storage devices of claim 14 wherein the method further comprises:
    connecting to an image capture device to input a 2D image of the instance.

16. The one or more computer-readable storage devices of claim 14 wherein the method further comprises:

computing an alignment error between the at least one 2D image and the 3D curve model of the at least one instance.

17. The one or more computer-readable storage devices of claim 14 wherein the method further comprises:
computing a distance transform image, the distance transform image comprising an alignment error.

18. The one or more computer-readable storage devices of claim 14 wherein the method further comprises:
computing a non-linear least square distance.

19. The one or more computer-readable storage devices of claim 14 wherein the method further comprises:
computing a Jacobian for camera parameters.

20. The one or more computer-readable storage devices of claim 14 wherein the method further comprises:
computing a distance transform image, the distance transform image comprising an alignment error; and
computing a Jacobian for camera parameters.

* * * * *